B. M. BOLSER.
STEERING DEVICE.
APPLICATION FILED APR. 2, 1917.

1,276,318.

Patented Aug. 20, 1918.

Witnesses

Inventor
B. M. Bolser.
By
Attorney

UNITED STATES PATENT OFFICE.

BENJAMIN M. BOLSER, OF CENTERVILLE, WASHINGTON.

STEERING DEVICE.

1,276,318.      Specification of Letters Patent.      Patented Aug. 20, 1918.

Application filed April 2, 1917. Serial No. 159,263.

*To all whom it may concern:*

Be it known that I, BENJAMIN M. BOLSER, a citizen of the United States, residing at Centerville, in the county of Klickitat, State of Washington, have invented certain new and useful Improvements in Steering Devices; and I do hereby declare the following to be a full, clear, and exact description of the invention, such as will enable others skilled in the art to which it appertains to make and use the same.

This invention is an improvement in steering devices and has particular reference to a mechanism for operating the caster wheels of a header or other agricultural machine.

An object of the invention is the provision of a simple and improved steering apparatus which will permit the operator of the machine to adjust the casting wheels through the medium of foot actuated pedals so that the hands may be employed for other purposes.

The inventive idea involved is capable of receiving a variety of mechanical expressions, one of which, for the purpose of illustrating the invention, is shown in the accompanying drawing, wherein:—

Figure 1:
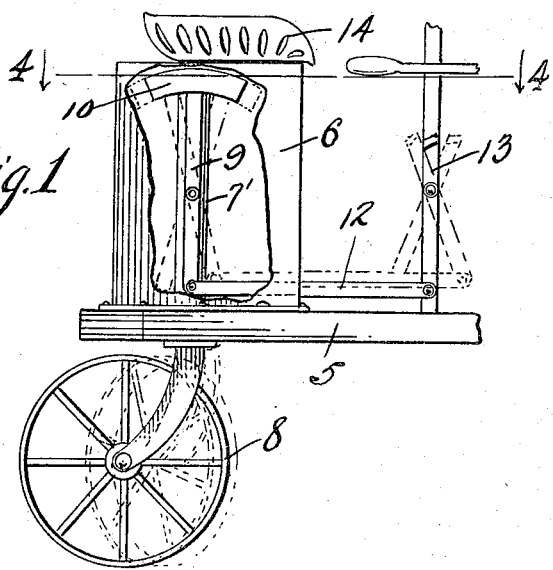
Figure 1 is a fragmentary side elevation of a portion of an agricultural machine showing the steering device applied thereto.
Figure 2:
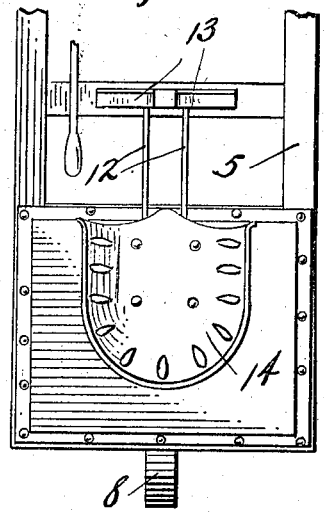
Fig. 2 is a top plan view thereof.
Figure 3:
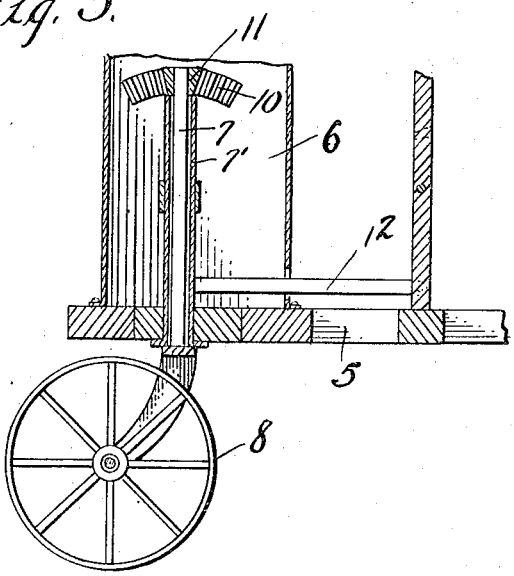
Fig. 3 is a vertical longitudinal section.

Referring more particularly to the accompanying drawing in which like reference characters indicate similar parts, the numeral 5 indicates a portion of the frame of a machine having a housing 6 mounted upon the rear end thereof through which extends a vertically arranged spindle 7 mounted in a sleeve 7′ the lower end of said spindle projecting below the frame 5 and having mounted thereon a caster wheel 8 of any preferred construction.

Figure 4:
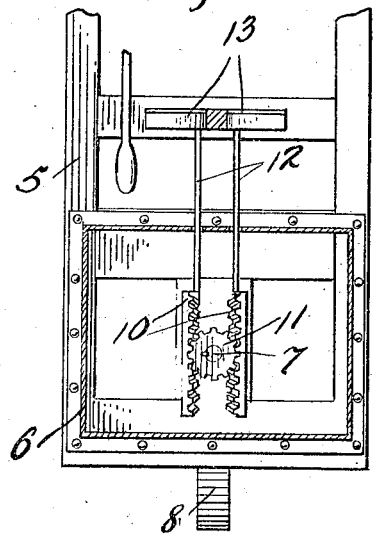
Fig. 4 is a section on the line 4—4 of Fig. 1.

The mechanism for rotating the spindle 7 to adjust the wheel 8 preferably comprises a pair of levers 9 pivoted intermediate their ends to opposed sides of the sleeve 7′, said levers being in a substantial vertical position and each having at its upper end a transverse arcuate ring member 10 adapted for engagement with a pinion 11 carried upon the upper end of the spindle 7. It will be apparent from Fig. 4 that the rack members 10 of the members 9 engage on opposite sides of the gear 11 so that the spindle 7 may be rotated in either direction.

Means for operating the levers 9 preferably comprises a connecting rod 12 for each lever pivotally connected to the lower end thereof and extending forwardly through an opening in the housing 6 and pivoted at its forward end to a foot pedal 13 mounted in any suitable manner upon the machine. It will thus be seen that by operating one of the foot pedals the lever 9 to which it is connected will be rocked about its pivot thus causing the rack member 10 to rotate the gear 11 and the spindle 7 in the desired direction.

The top of the housing 6 has secured thereto in any suitable manner the operator's seat 14 which is conveniently positioned so that the operator may attend to the adjustments of different parts of the machine.

What is claimed is:—

A steering device of the class described comprising a housing, a spindle inclosed by said housing and rotatable therein and having a caster wheel at one end, a sleeve surrounding the major portion of said spindle, a gear carried by spindle and interiorly of said housing, arcuate rack members also inclosed in said housing and engaging on opposite sides of said gear for rotating the same in opposite directions, levers pivoted to said sleeve and connected to said rack members, and foot pedals mounted exteriorly of said housing and connected to said levers whereby to actuate said rack members.

In testimony whereof, I affix my signature in the presence of two witnesses.

BENJAMIN M. BOLSER.

Witnesses:
    GEO. DUNN,
    L. K. MCLARY.

Copies of this patent may be obtained for five cents each, by addressing the "Commissioner of Patents, Washington, D. C."